(12) United States Patent
Lee et al.

(10) Patent No.: US 12,134,107 B2
(45) Date of Patent: Nov. 5, 2024

(54) MULTI-SLOT DIE COATER

(71) Applicant: LG Energy Solution, Ltd., Seoul (KR)

(72) Inventors: Taek-Soo Lee, Daejeon (KR);
Min-Kyu Kang, Daejeon (KR);
Shin-Wook Jeon, Daejeon (KR);
Sang-Hoon Choy, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 0 days.

(21) Appl. No.: 17/925,147

(22) PCT Filed: Sep. 13, 2021

(86) PCT No.: PCT/KR2021/012443
§ 371 (c)(1),
(2) Date: Nov. 14, 2022

(87) PCT Pub. No.: WO2022/065777
PCT Pub. Date: Mar. 31, 2022

(65) Prior Publication Data
US 2023/0173530 A1    Jun. 8, 2023

(30) Foreign Application Priority Data

Sep. 28, 2020  (KR) .................. 10-2020-0126043

(51) Int. Cl.
*B05C 5/02*       (2006.01)
*H01M 4/04*       (2006.01)
*H01M 10/04*      (2006.01)

(52) U.S. Cl.
CPC ............ *B05C 5/027* (2013.01); *B05C 5/0254* (2013.01); *H01M 4/0404* (2013.01); *H01M 10/04* (2013.01)

(58) Field of Classification Search
None
See application file for complete search history.

(56) References Cited

U.S. PATENT DOCUMENTS 3,151,356 A    10/1964   Vance
5,425,967 A *  6/1995   Tomaru ............... B05C 5/0254
                                                    118/411
(Continued)

FOREIGN PATENT DOCUMENTS

JP    H11314065 A       11/1999
JP    2001345096 A  *  12/2001
(Continued)

OTHER PUBLICATIONS

Extended European Search Report including Written Opinion for Application No. 21872806.1 dated Nov. 21, 2023, pp. 1-10.
(Continued)

*Primary Examiner* — Binu Thomas
(74) *Attorney, Agent, or Firm* — Lerner David LLP

(57) ABSTRACT

A multi-slot die coater includes a first slot and a second slot to extrude and coat a coating solution on a surface of a continuously moving substrate through at least one of the first slot or the second slot, and includes a first outer die block; an intermediate die block positioned on the first outer die block such that the first slot is formed between the intermediate die block and the first outer die block; and a second outer die block positioned on the intermediate die block such that the second slot is formed between the second outer die block and the intermediate die block, wherein the die-coater includes contact surfaces between the first outer die block, the intermediate die block and the second die block that are inclined relative to a first plane and a fastener is fastened substantially perpendicular to one of the inclined contact surfaces.

20 Claims, 8 Drawing Sheets

(56) References Cited

U.S. PATENT DOCUMENTS

| | | | | |
|---|---|---|---|---|
| 5,458,291 | A * | 10/1995 | Brusko | B05C 5/0254 |
| | | | | 239/433 |
| 5,740,963 | A * | 4/1998 | Riney | B05C 5/0275 |
| | | | | 239/597 |
| 2001/0002281 | A1 | 5/2001 | Mandai et al. | |
| 2002/0023584 | A1* | 2/2002 | Mandai | B05C 5/0254 |
| | | | | 118/123 |
| 2006/0090322 | A1 | 5/2006 | Ciliske et al. | |
| 2008/0145530 | A1* | 6/2008 | Bondeson | B05C 5/027 |
| | | | | 118/315 |
| 2008/0274223 | A1* | 11/2008 | Cloeren | B05C 5/0254 |
| | | | | 425/133.5 |
| 2010/0247792 | A1* | 9/2010 | Emoto | B05C 5/0254 |
| | | | | 118/231 |
| 2018/0250701 | A1* | 9/2018 | Kuenne | B05C 5/027 |
| 2019/0351446 | A1* | 11/2019 | Lee | B05C 5/0262 |

FOREIGN PATENT DOCUMENTS

| | | | |
|---|---|---|---|
| JP | 2003112101 | A | 4/2003 |
| JP | 2003117463 | A | 4/2003 |
| JP | 3739134 | B2 | 1/2006 |
| JP | 2019107606 | A | 7/2019 |
| JP | 2020131082 | A * | 8/2020 |
| JP | 2020131084 | A | 8/2020 |
| KR | 20070083825 | A | 8/2007 |
| KR | 20190019827 | A | 2/2019 |
| KR | 20200035642 | A | 4/2020 |

OTHER PUBLICATIONS

International Search Report for PCT/KR2021/012443 mailed Dec. 21, 2021. 3 pgs.

* cited by examiner

MULTI-SLOT DIE COATER

CROSS-REFERENCE TO RELATED APPLICATIONS

The present application is a national phase entry under 35 U.S.C. § 371 of International Application No. PCT/KR2021/012443, filed on Sep. 13, 2021, which claims priority from Korean Patent Application Nos. 10-2020-0126043 filed on Sep. 28, 2020, in the Republic of Korea, the disclosure of which is incorporated herein by reference.

TECHNICAL FIELD

The present disclosure relates to a multi-slot die coater capable of simultaneously forming two or more layers by wetting, and more particularly, to a multi-slot die coater with suppressed deformation and twist which are induced by the structural feature due to including a thin die.

BACKGROUND ART

With the increasing technology development and the growing demand for mobile devices, the demand for secondary batteries as an energy source is rapidly increasing, and such secondary batteries essentially include an electrode assembly which is a power generation element. The electrode assembly includes a positive electrode, a separator and a negative electrode stacked at least once, and the positive electrode and the negative electrode are manufactured by coating and drying a positive electrode active material slurry and a negative electrode active material slurry on a current collector made of an aluminum foil and a current collector made of a copper foil, respectively. For the uniform charging/discharging characteristics of the secondary batteries, it is necessary to uniformly coat the positive electrode active material slurry and the negative electrode active material slurry on the current collector, and slot die coaters have been used.

The electrode manufacturing method using the slot die coater includes coating the electrode active material slurry issuing from the slot die coater on the current collector moving by a coating roll. The conventional slot die coater includes two dies and a slot between the two dies, and may dispense one type of electrode active material slurry through one slot to form a layer of electrode active material.

To manufacture the secondary batteries with high energy density, the thickness of the electrode active material layer which was about 130 μm has gradually increased up to 300 μm. When the thick electrode active material layer is formed by the conventional slot die coater, a binder and a conductive material in the active material slurry migrate fast during drying, and the finally manufactured electrode is not uniform. To solve this problem, when forming the electrode active material layer at a small thickness and drying and repeating this process thereon, it takes a long time to perform coating twice. To improve both electrode performance and productivity, the inventors have proposed a dual slot die coater capable of simultaneously coating two types of electrode active material slurries.

FIG. 1 is a schematic cross-sectional view of the dual slot die coater according to the related art.

Referring to FIG. 1, two electrode active material layers may be simultaneously formed on the current collector 15 by coating two types of electrode active material slurries from the dual slot die coater 20 while rotating the coating roll 10 to move the current collector 15. The electrode active material slurry coming out of the dual slot die coater 20 is coated over one surface of the current collector 15 to form the electrode active material layer.

The dual slot die coater 20 is constructed by assembling three plate members, i.e., three die blocks 21, 22, 23. Slots are formed between the adjacent die blocks, and thus two slots are formed, and the two types of electrode active material slurries are simultaneously dispensed through exit ports 24, 25, each in communication with each slot, so two electrode active material layers may be simultaneously formed by continuously coating an additional electrode active material slurry on the electrode active material layer formed by the previously coated electrode active material slurry. The reference numbers 26, 27 indicate manifolds which hold a coating solution.

However, due to using the electrode active material slurries simultaneously issuing from the different exit ports 24 and 25, the process using the dual slot die coater 20 is quite difficult to form each electrode active material layer at a desired thickness.

In general, the thickness of each electrode active material layer is affected by the amount of the electrode active material slurry coming out through the exit ports 24, 25, and the amount of the electrode active material slurry coming out is significantly affected by the size (slot gap) of each exit port 24, 25, and thus to form a desired thickness, the conventional art needs to repeat the task of testing the coating process a few times, disassembling and re-assembling the die blocks 21, 22, 23, adjusting the slot gap and checking the amount of the electrode active material slurry coming out. However, the slot gap is a variable that is adjusted so sensitively that the coating gap greatly changes depending on the fastening strength of bolts used to assemble the die blocks 21, 22, 23, and may be changed by a force when the electrode active material slurry emerges. In particular, to stably perform uniform coating in the widthwise direction (TD direction) along the movement direction (MD direction) of the current collector, uniform dimensional precision in the widthwise direction is needed, and it is more difficult to uniformly control the widthwise slot gap as the width of the dual slot die coater 20 increases to use the wide current collector in order to increase the production amount.

Since the dual slot die coater 20 basically includes three die blocks 21, 22, 23, to configure it as a device having a foot print and volume similar to the conventional slot die coater including one slot, it is necessary to reduce the thickness of each of the die blocks 21, 22, 23, and by this reason, inevitably, it is structurally vulnerable to deformation and twist. When deformation or twist occurs, the adjusted slot gap is changed, causing defects in the electrode process. Furthermore, this problem will be more serious with a multi-slot die coater including two or more slots due to the increased number of die blocks.

To solve this problem, when each die block 21, 22, 23 increases in size (change in angle), the direction in which the slurry emerges changes, resulting in reduced coating workability. Additionally, among the three die blocks 21, 22, 23, when the die blocks 21, 23 disposed on the outer side increase in thickness to prevent deformation and twist, it is still difficult to prevent deformation of the most structurally vulnerable intermediate die block 22.

Meanwhile, each die block 21, 22, 23 may be assembled by bolt fastening to the contact surface. However, each die block 21, 22, 23 is vulnerable to deformation due to its small thickness, and bolt fastening is prone to cause deformation by the action of a large force, so caution is required. When movement is made between the die blocks 21, 22, 23 by the force applied when fastening, the movement affects the coating gap, i.e., the distance between the exit ports 24, 25 and the current collector 15, resulting in non-uniform coating.

DISCLOSURE

Technical Problem

The present disclosure is designed to solve the above-described problem, and therefore the present disclosure is directed to providing a multi-slot die coater with reduced structural vulnerability to deformation and twist in the multi-slot die coater basically including three die blocks.

However, the technical problems to be solved by the present disclosure are not limited to the above problems, and other problems that are not mentioned will be clearly understood by those skilled in the art from the description of the invention described below.

Technical Solution

To solve the above-described technical problem, a multi-slot die coater according to the present disclosure is a multi-slot die coater including a lower slot and an upper slot to extrude and coat a coating solution on a surface of a continuously moving substrate through at least one of the lower slot or the upper slot, and the multi-slot die coater includes a lower die block; an intermediate die block positioned on the lower die block such that the lower slot is formed between the intermediate die block and the lower die block; and an upper die block positioned on the intermediate die block such that the upper slot is formed between the upper die block and the intermediate die block, wherein at least some of contact surfaces between the lower die block, the intermediate die block and the upper die block are inclined to a horizontal plane and a bolt is fastened perpendicular to the inclined contact surface.

The perpendicular range may be an angle range of 90±10° from the contact surface.

The contact surface between the upper die block and the intermediate die block may be inclined.

The intermediate die block may include a first intermediate die block and a second intermediate die block in surface contact with each other at upper and lower positions, the first intermediate die block and the second intermediate die block provided slidably along a contact surface to make a relative movement, and the first intermediate die block may be fixed and coupled to the lower die block, and the second intermediate die block may be fixed and coupled to the upper die block.

The lower die block, the intermediate die block and the upper die block may have a lower die lip, an intermediate die lip and an upper die lip, each forming a front end thereof, respectively, a lower exit port may be formed between the lower die lip and the intermediate die lip and may be in communication with the lower slot, an upper exit port may be formed between the intermediate die lip and the upper die lip and may be in communication with the upper slot, and a predetermined step may be formed between the lower exit port and the upper exit port.

The multi-slot die coater may further include a first spacer interposed between the lower die block and the intermediate die block to adjust a width of the lower slot, and a second spacer interposed between the intermediate die block and the upper die block to adjust a width of the upper slot.

The lower die block may include a first manifold which holds a first coating solution, the first manifold being in communication with the lower slot, and the intermediate die block may include a second manifold which holds a second coating solution, the second manifold being in communication with the upper slot.

The lower slot and the upper slot may form an angle of 30° to 60°.

In the multi-slot die coater according to the present disclosure, the bolt may have a bolt head protruding beyond the upper die block.

A bolt leg of the bolt may include a threaded portion close to the intermediate die block and a plain portion close to the upper die block, and the upper die block and the intermediate die block may have bolt holes aligned with each other to accommodate the bolt.

Advantageous Effects

According to an aspect of the present disclosure, bolt fastening is performed perpendicular to the inclined contact surface between the die blocks. When bolt fastening is performed perpendicular to the contact surface according to the present disclosure, the direction of the force at the time of bolt fastening is perpendicular to the inclined contact surface, thereby avoiding slip. Accordingly, the die block does not slip due to the force by bolt tightening in the bolt by the application of the fastening torque, not simply fixing.

According to an aspect of the present disclosure, it is possible to reduce a change in coating gap when mounting the multi-slot die coater by assembling the die blocks. It is also possible to suppress slot gap deviation. Accordingly, according to the present disclosure, it is possible to minimize deformation of the die blocks and ensure widthwise loading uniformity, thereby improving the coating quality.

According to an aspect of the present disclosure, it is possible to reduce the structural vulnerability of the die block to deformation or twist, and thereby uniformly form the coating layer, especially, the electrode active material layer, at a desired thickness, and it is possible to coat at least two types of electrode active material slurries at the same time, thereby achieving high performance and productivity. It is possible to prevent slip when fastening the die blocks, thereby ensuring coating workability and reproducibility. When the multi-slot die coater of the present disclosure is used to coat an electrode active material slurry on a current collector in the manufacture of an electrode of a secondary battery, it is possible to achieve uniform coating under high-speed or wide-scale coating conditions.

According to another aspect of the present disclosure, the bolt head is not embedded in the upper die block and protrudes beyond the upper die block. Even though there is a tolerance of the hole for bolt fastening, since the bolt head closes the hole, it is possible to prevent impurities from entering the hole. Accordingly, it is possible to prevent the imbalance of the bolt fastening assembly caused by the impurity introduced into the hole and avoid deformation of each die block.

DESCRIPTION OF DRAWINGS

The accompanying drawings illustrate a preferred embodiment of the present disclosure and together with the detailed description of the present disclosure, serve to provide further understanding of the technical features of the present disclosure, and thus, the present disclosure is not construed as being limited to the drawing.

BEST MODE

Figure 1:
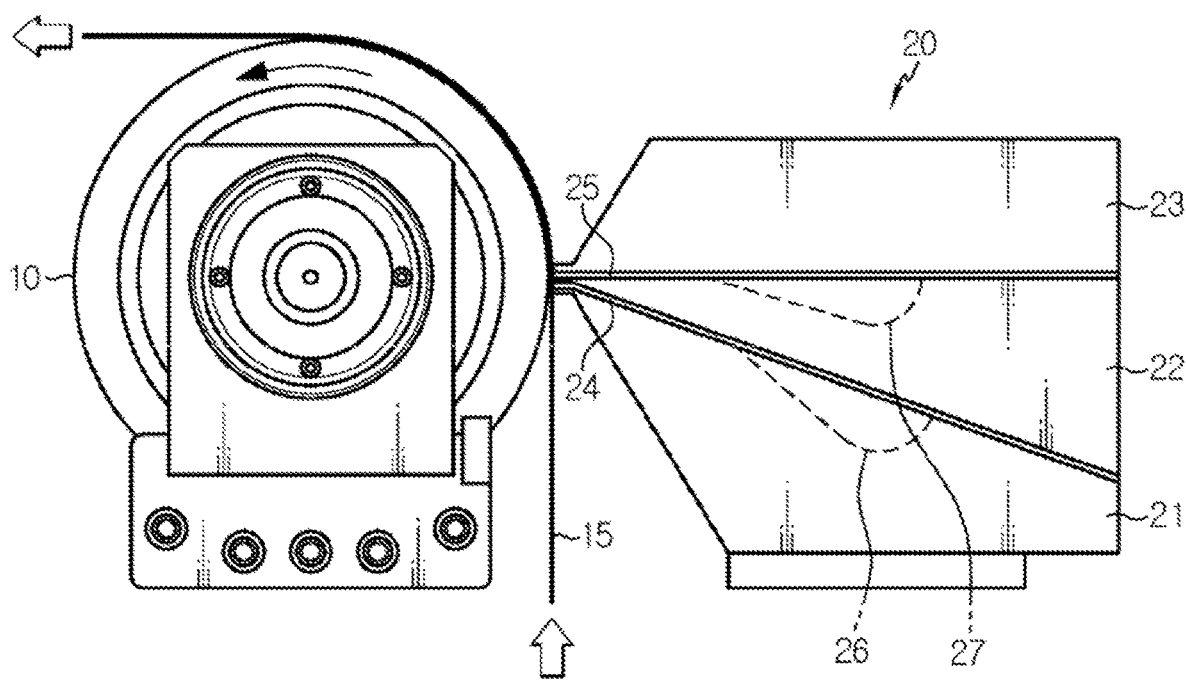
FIG. 1 is a schematic cross-sectional view of a dual slot die coater according to the related art.

Hereinafter, preferred embodiments of the present disclosure will be described in detail with reference to the accompanying drawings. Prior to the description, it should be understood that the terms or words used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments described herein and illustrations in the drawings are just some preferred embodiments of the present disclosure and do not fully describe the technical features of the present disclosure, so it should be understood that a variety of other equivalents and modifications could have been made thereto at the time of filing the patent application.

A multi-slot die coater according to an embodiment of the present disclosure may include two or more slots. Basically, the multi-slot die coater is an apparatus including a lower slot and an upper slot to coat a coating solution in a double layer on a substrate. The 'substrate' described below is a current collector and the coating solution is an 'electrode active material slurry'. Both a first coating solution and a second coating solution are electrode active material slurries, and they may have the same or different compositions (types of an active material, a conductive material and a binder), amounts (amounts of the active material, the conductive material and the binder) or properties. The multi-slot die coater according to an embodiment of the present disclosure is optimized for electrodes manufactured by applying at least two types of electrode active material slurries at the same time or by pattern coating by applying at least two types of electrode active material slurries in an alternating manner. However, the scope of the present disclosure is not necessarily limited thereto. For example, the substrate may be a porous support for a separator, and the first coating solution and the second coating solution may be organics having different compositions or properties. That is, in case that thin film coating is required, the substrate, the first coating solution and the second coating solution are not limited to particular types.

Figure 2:
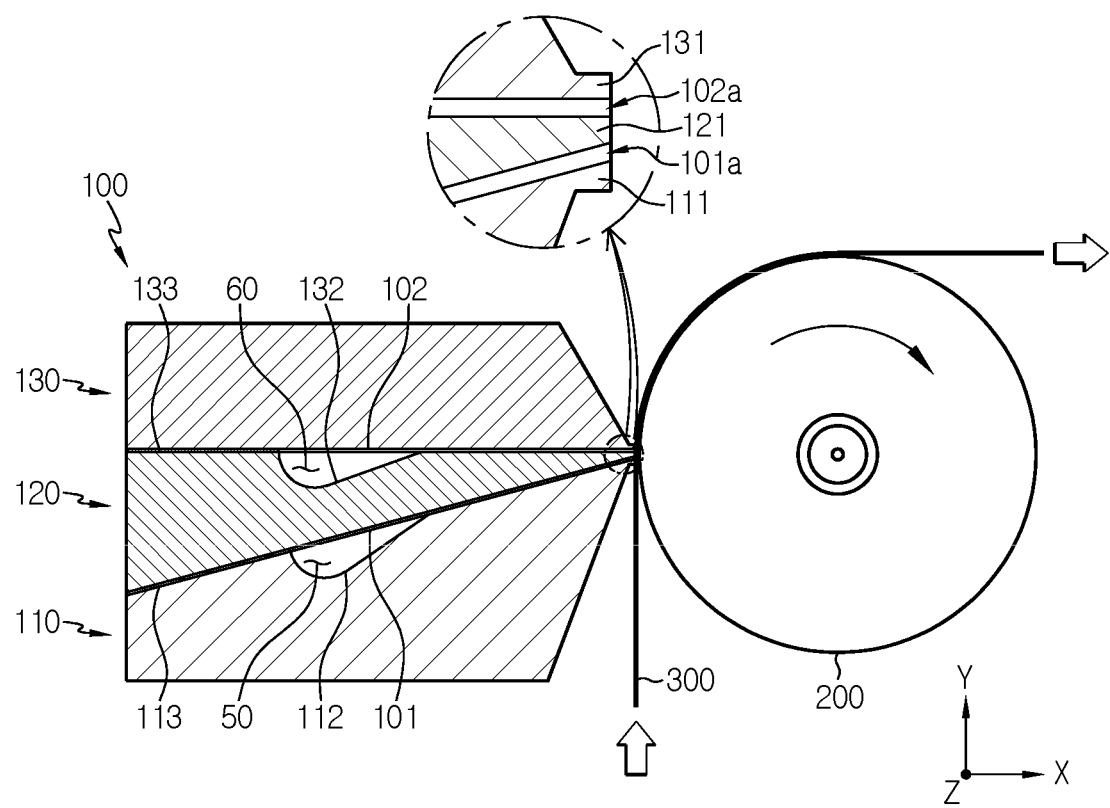
FIG. 2 is a schematic cross-sectional view of a multi-slot die coater according to an embodiment of the present disclosure.
Figure 3:
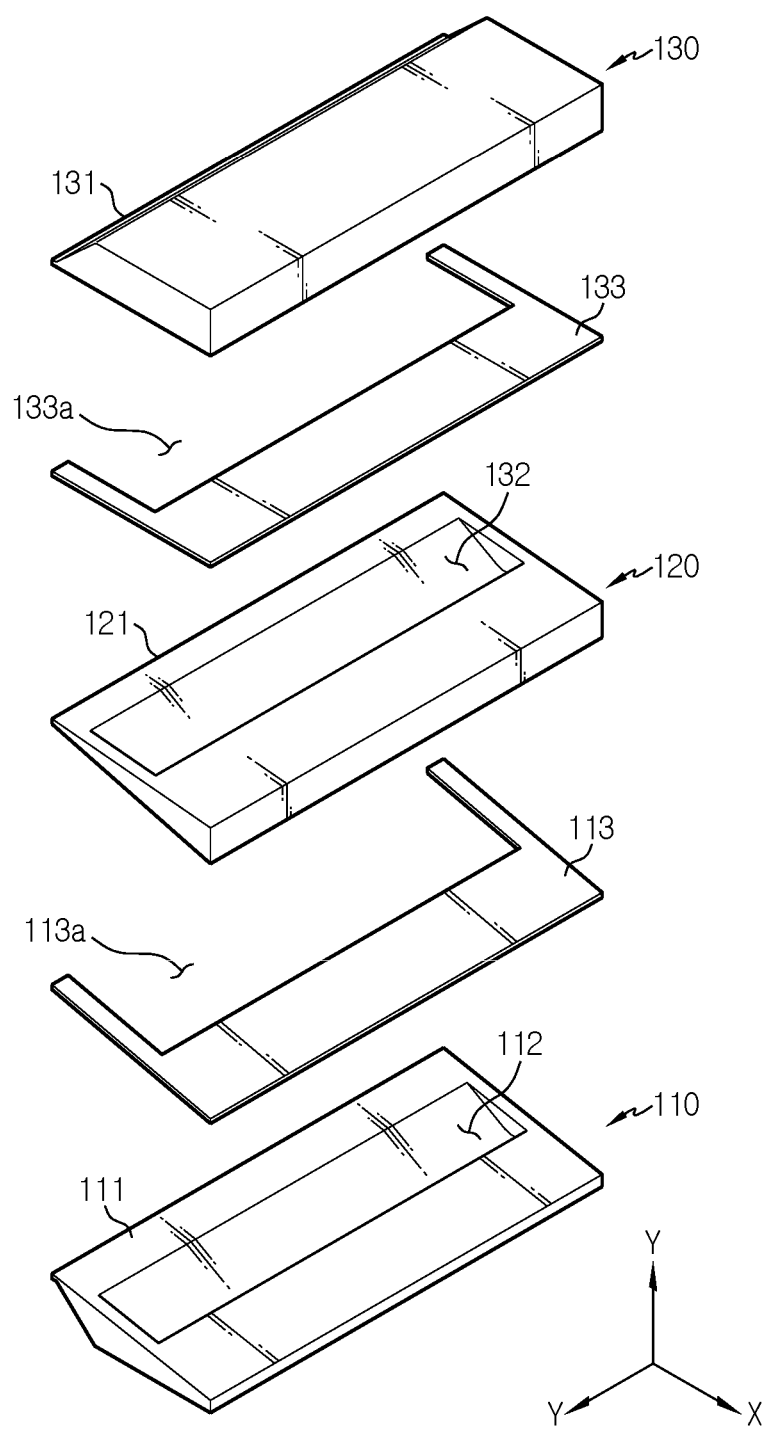
FIG. 3 is a schematic exploded perspective view of a multi-slot die coater according to an embodiment of the present disclosure.

FIG. 2 is a schematic cross-sectional view of the multi-slot die coater according to an embodiment of the present disclosure. FIG. 3 is a schematic exploded perspective view of the multi-slot die coater according to an embodiment of the present disclosure.

The multi-slot die coater 100 according to an embodiment of the present disclosure is a dual slot die coater including a lower slot 101 and an upper slot 102, and is an apparatus capable of simultaneously or alternately coating a same type of coating solution or two different types of coating solutions on a substrate 300 through the lower slot 101 and the upper slot 102. Referring to FIGS. 2 and 3, the multi-slot die coater 100 includes a lower die block 110, an intermediate die block 120 positioned on or adjacent the lower die block 110, and an upper die block 130 positioned on or adjacent the intermediate die block 120. The die blocks 110, 120, 130 are assembled with one another though a fastener, for example, a bolt, and it will be described in detail below.

The lower die block 110 is the lowermost block among the blocks of the multi-slot die coater 100, and the surface facing the intermediate die block 120 is inclined relative to the bottom surface (X-Z plane) or the horizontal plane. According to embodiments, the surface of the lower die block 110 facing the intermediate die block 120 may be almost parallel to the horizontal plane.

Referring to FIGS. 2 and 3, the lower slot 101 may be formed in an area at which the lower die block 110 and the intermediate die block 120 are in contact with each other. For example, a first spacer 113 is interposed between the lower die block 110 and the intermediate die block 120 to form a gap between, and the lower slot 101 corresponding to a passage through which the first coating solution 50 flows may be formed. In this case, the thickness of the first spacer 113 determines the vertical width (Y-axis direction, the slot gap) of the lower slot 101. Conventionally, however, since the die blocks are vulnerable to deformation and twist, it was difficult to maintain the slot gap.

As shown in FIG. 3, the first spacer 113 has a first opening portion 113a which is cut at an area, and may be interposed in the remaining portion except one side in the edge area of the facing surface of each of the lower die block 110 and the intermediate die block 120. Accordingly, a lower exit port 101a through which the first coating solution 50 emerges is only formed between the front end of the lower die block 110 and the front end of the intermediate die block 120. The front end of the lower die block 110 and the front end of the intermediate die block 120 are defined as a lower die lip 111 and an intermediate die lip, respectively, and in other words, the lower exit port 101a is formed by the spacing between the lower die lip 111 and the intermediate die lip 121.

For reference, the first spacer 113 acts as a gasket to prevent the leakage of the first coating solution 50 through the gap between the lower die block 110 and the intermediate die block 120 except the area where the lower exit port 101a is formed, and thus the first spacer 113 is preferably made of a material having sealing ability.

The lower die block 110 includes a first manifold 112 having a predetermined depth on the surface facing the intermediate die block 120, and the first manifold 112 is in communication with the lower slot 101. Although not shown in the drawings, the first manifold 112 is connected to a first coating solution supply chamber (not shown) installed outside with a supply pipe and is supplied with the first coating solution 50. When the first manifold 112 is fully filled with the first coating solution 50, the flow of the first coating solution 50 is guided along the lower slot 101 and comes out of the lower exit port 101a. The intermediate die block 120 is a block in the middle of the blocks of the multi-slot die coater 100, and is a block interposed between the lower die block 110 and the upper die block 130 to form a dual slot. Although the intermediate die block 120 of this embodiment is a right-angled triangle in cross section, the shape is not necessarily limited thereto, and the intermediate die block 120 may be, for example, an isosceles triangle in cross section.

The upper die block 130 is positioned in contact with the upper surface of the intermediate die block 120 parallel to the horizontal plane. The upper slot 102 is formed in an area at which the intermediate die block 120 and the upper die block 130 are in contact with each other. According to embodiments, the upper surface of the intermediate die block 120 may be inclined relative to the horizontal plane, and in this case, the upper die block 130 may be positioned at an angle relative to the horizontal plane and in contact with the upper surface of the intermediate die block 120.

Figure 4:
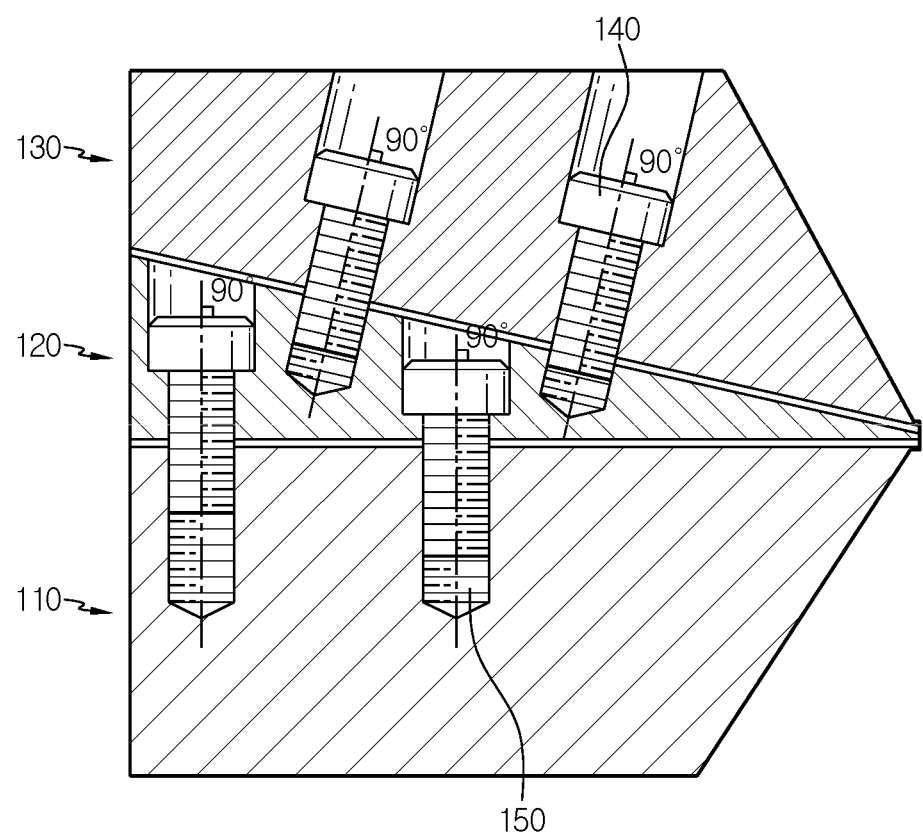
FIG. 4 is a cross-sectional view showing bolt fastening between die blocks in a multi-slot die coater according to an embodiment of the present disclosure.

In any case, at least some of the contact surfaces between the die blocks 110, 120, 130 of the multi-slot die coater 100 according to the present disclosure are inclined relative to the horizontal plane. Although the example shown in FIG. 2 depicts the inclined contact surface between the lower die block 110 and the intermediate die block 120 to the horizontal plane, the multi-slot die coater 100 as shown in FIG. 4 has the inclined contact surface between the upper die block 130 and the intermediate die block 120 to the horizontal plane. In any case, the present disclosure is characterized as including bolts fastened perpendicular to the inclined contact surface. It will be described in detail below.

In the same way as the lower slot 101 described above, a second spacer 133 may be interposed between the intermediate die block 120 and the upper die block 130 to form a gap therebetween. Accordingly, the upper slot 102 corresponding to a passage through which a second coating solution 60 flows is formed. In this case, the vertical width (Y-axis direction, the slot gap) of the upper slot 102 is determined by the second spacer 133. Conventionally, however, it was difficult to maintain the slot gap since the die blocks are vulnerable to deformation and twist.

In addition, the second spacer 133 having the similar structure to the first spacer 113 has a second opening portion 133a which is cut at an area, and is interposed in the remaining portion except one side in the edge area of the facing surface of each of the intermediate die block 120 and the upper die block 130. Likewise, the circumferential direction, except the front side of the upper slot 102, is blocked, and the upper exit port 102a is only formed between the front end of the intermediate die block 120 and the front end of the upper die block 130. The front end of the upper die block 130 is defined as an upper die lip 131, and in other words, the upper exit port 102a is formed by the spacing between the intermediate die lip 121 and the upper die lip 131.

In addition, the intermediate die block 120 includes a second manifold 132 having a predetermined depth on the surface facing the upper die block 130, and the second manifold 132 is in communication with the upper slot 102. Although not shown in the drawings, the second manifold 132 is connected to a second coating solution 60 supply chamber installed outside with a supply pipe and is supplied with the second coating solution 60. When the second coating solution 60 is supplied from the external source along the supply pipe, and the second manifold 132 is fully filled with the second coating solution 60, the flow of the second coating solution 60 is guided along the upper slot 102 in communication with the second manifold 132 and comes out of the upper exit port 102a.

The upper slot 102 and the lower slot 101 form an angle, and the angle may be approximately 30° to 60°. The upper slot 102 and the lower slot 101 may intersect at one point, and the upper exit port 102a and the lower exit port 101a may be provided near the intersection point. Accordingly, the locations at which the first coating solution 50 and the second coating solution 60 emerge may be concentrated on approximately one point.

According to the multi-slot die coater 100 having such a configuration, a rotatable coating roll 200 is positioned in front of the multi-slot die coater 100, and the coating roll 200 may rotate to move the substrate 300 to be coated, while continuously contacting the first coating solution 50 and the second coating solution 60 with the surface of the substrate 300, and thereby the substrate 300 may be coated in a double layer. Alternatively, pattern coating may be intermittently formed on the substrate 300 by performing the supply and stop of the first coating solution 50 and the supply and stop of the second coating solution 60 in an alternating manner.

The multi-slot die coater 100 extrudes and coats the coating solution on the surface of the continuously moving substrate 300 through at least one of the lower slot 101 or the upper slot 102. The multi-slot die coater 100 of the present disclosure involves bolt fastening to the contact surface between the die blocks 110, 120, 130. FIG. 4 is a cross-sectional view showing bolt fastening between the die blocks in the multi-slot die coater according to an embodiment of the present disclosure.

Referring to FIG. 4, among the contact surfaces between the lower die block 110, the intermediate die block 120 and the upper die block 130, the contact surface between the upper die block 130 and the intermediate die block 120 is inclined relative to the horizontal plane. A bolt 140 is fastened perpendicular to the inclined contact surface. A bolt 150 is fastened to the contact surface between the lower die block 110 and the intermediate die block 120. A plurality of bolts 140 may be fastened along the widthwise direction of the upper die block 130, and a plurality of bolts 140 may be fastened along the lengthwise direction of the upper die block 130.

Figure 5:
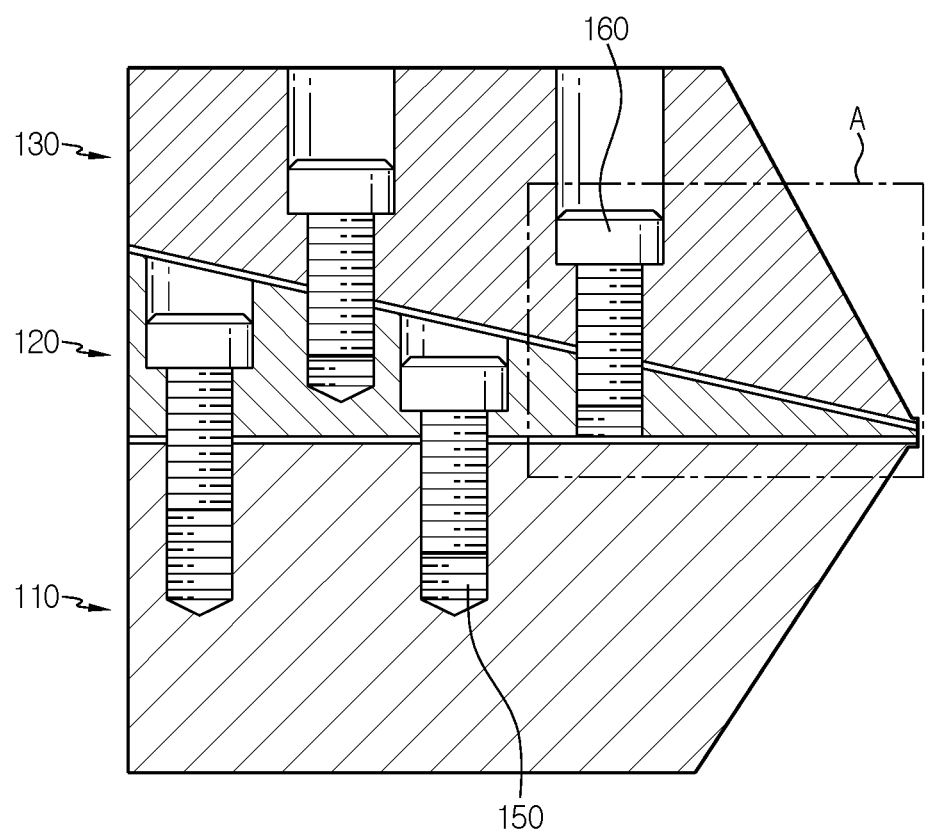
FIG. 5 is a cross-sectional view showing bolts fastened perpendicular to the horizontal plane, not perpendicular to the inclined contact surface between the die blocks as opposed to the present disclosure.
Figure 6:
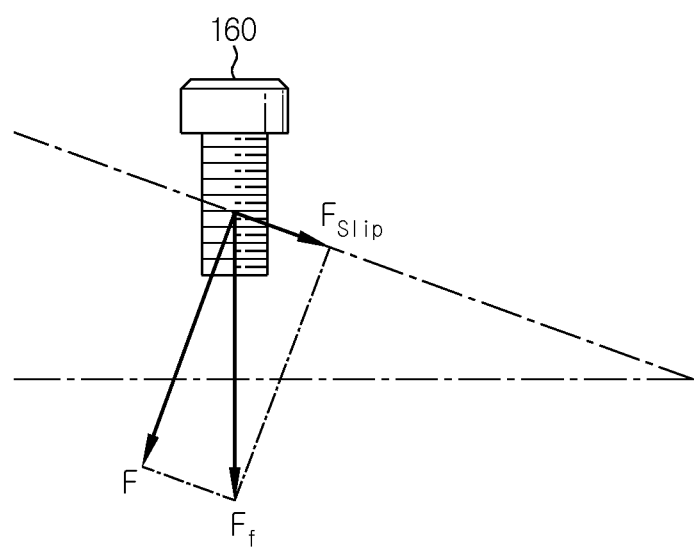
FIG. 6 shows a direction of a force applied to a die block at a bolt fastening angle of FIG. 5.

It is important to fasten the bolt 140 perpendicular to the inclined contact surface. Here, the perpendicular range may refer to an angle range of 90±10° from the contact surface. FIG. 4 shows 90°. To describe the unexpected benefit when the bolt 140 is fastened perpendicular to the inclined contact surface, a comparison is made with a bolt which is not fastened perpendicular to the inclined contact surface. FIG. 5 is a cross-sectional view showing the bolt fastened perpendicular to the horizontal plane, not perpendicular to the inclined contact surface between the die blocks as opposed to the present disclosure. FIG. 6 shows section A in FIG. 5, and depicts the direction of the force applied to the die block at the bolt fastening angle of FIG. 5.

Referring to FIG. 5, a bolt 160 is fastened to the inclined contact surface between the intermediate die block 120 and the upper die block 130 perpendicular to the horizontal plane. As a result, the bolt 160 has an angle of 105° relative to the inclined contact surface. Referring to FIG. 6, due to the angle by the inclination of the intermediate die block 120, force $F_f$ (axial tension) by the bolt 160 tightening is split into force $F$ perpendicular to the contact surface and force $F_{slip}$ parallel to the contact surface, and slip by the force $F_{slip}$ parallel to the contact surface will occur. When movement is made between the die blocks 21, 22, 23 by the force applied when fastening, the movement affects the coating gap, i.e., the distance between the upper and lower exit ports 101a, 102a and the substrate 300, resulting in non-uniform coating.

Accordingly, the present disclosure fastens the bolt 140 perpendicular to the inclined contact surface as shown in FIG. 4. When the bolt 140 is fastened perpendicular to the contact surface according to the present disclosure, the direction of the force at the time of fastening the bolt 140 is perpendicular to the inclined contact surface, and thus there is no force parallel to the contact surface, thereby avoiding slip. Accordingly, the key point is to prevent the upper die block 130 from slipping due to the force by tightening the bolt 140 used to apply the fastening torque, not simple fixing. Accordingly, it is possible to reduce a change in coating gap when mounting the multi-slot die coater 100 by assembling the die blocks 110, 120, 130. In other words, it is possible to prevent slip on the contact surface between the die blocks 120, 130 in the process of fastening the bolt 140, and thus there is no change in alignment between the die blocks 120, 130 in the direction of the coating gap. Accordingly, according to the present disclosure, it is possible to minimize deformation of the die blocks 110, 120, 130 and ensure widthwise loading uniformity, thereby improving the coating quality. Additionally, according to the present disclosure, it is possible to suppress the slot gap deviation.

Hereinafter, an example of demonstrating the effect of the present disclosure through the simulation results will be described.

The action of the force as a function of bolt fastening angle is interpreted by calculating the force (bolt load, $F_f$) by bolt tightening occurring when a predetermined fastening torque is applied. The fastening torque is determined based on the torque coefficient, the diameter of the bolt and the bolt load. In a SUS based material system, under the assumption of the bolt diameter of 10 mm, when the fastening torque is 250 kgf·cm, the calculated bolt load $F_f$ is 12250 N.

First, when the bolt is fastened perpendicular to the horizontal plane on the contact surface at an angle θ relative to the horizontal plane as shown in FIG. 5, load is split into force perpendicular to the contact surface and force parallel to the contact surface by the inclination angle. Among them, the force $F_{slip}$ parallel to the contact surface is $F_f \sin \theta$. Under the assumption of the multi-slot die coater shown in FIG. 5, when it is assumed that friction between the spacer and the die block is 0.3 without considering the weight, slip occurs and a 7.43 um movement is made in the direction of the coating gap.

Subsequently, interpretation is made of the bolt fastened perpendicular to the contact surface as shown in FIG. 4 according to the present disclosure. Since θ is 0, the force parallel to the contact surface is 0. Accordingly, in this case, there is no slip and the upper die block does not slip in the direction of the coating gap. Accordingly, the bolt fastening according to the present disclosure may prevent slip and suppress the coating gap deviation.

According to the present disclosure, it is possible to prevent deformation or twist of the die block having structural vulnerability, and thereby uniformly form the coating layer, in particular, the electrode active material layer at a desired thickness, and it is possible to coat two types of electrode active material slurries at the same time, thereby achieving high performance and productivity. It is possible to prevent slip when fastening the die blocks, thereby ensuring coating workability and reproducibility. When the multi-slot die coater of the present disclosure is used to coat an electrode active material slurry on a current collector in the manufacture of an electrode of a secondary battery, it is possible to achieve uniform coating under high-speed or wide-scale coating conditions.

Although this embodiment describes applying the coating solution in two layers or performing pattern coating by supplying the coating solution in an alternating manner for illustrative purposes, it is obvious that the present disclosure may be applied to combination of two types of coating solutions in the middle of the slot or simultaneous coating of three or more layers using three or more slots, not dispensing through individual slots. It is obvious that four or more die blocks are needed for three or more slots.

Figure 7:
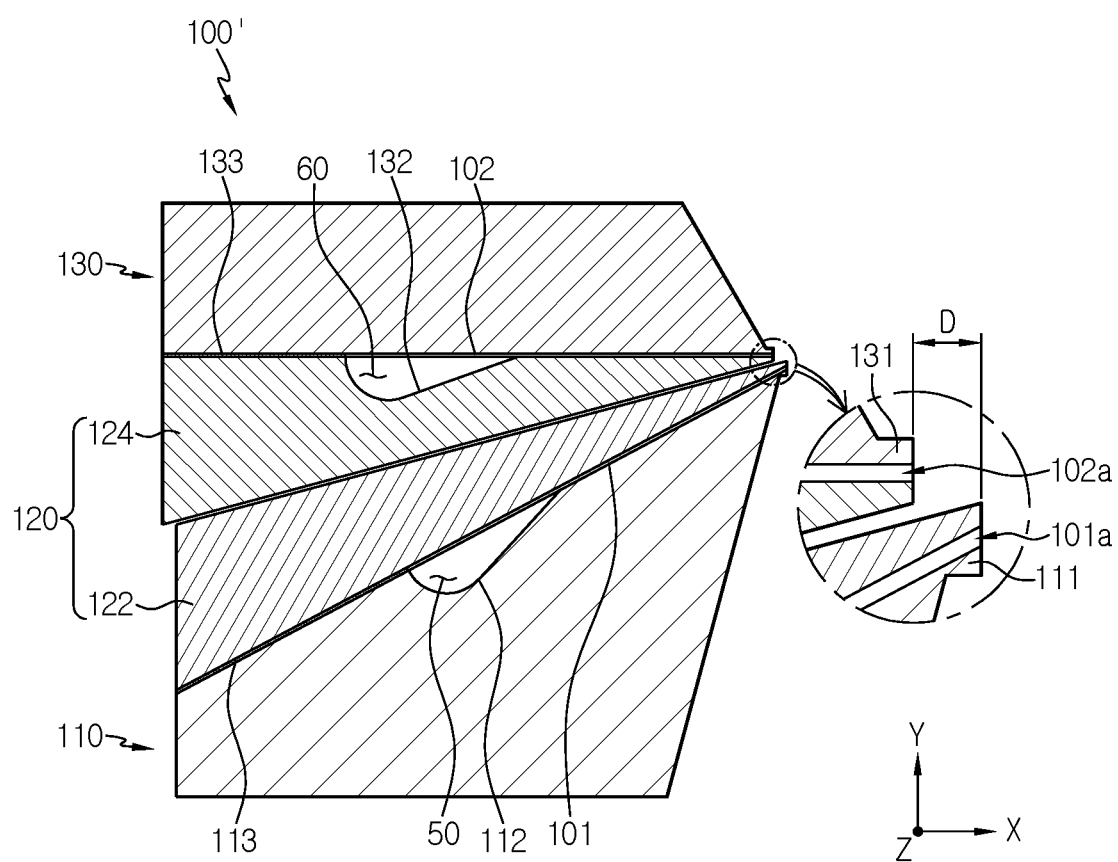
FIG. 7 is a cross-sectional view of a multi-slot die coater according to another embodiment of the present disclosure.

Subsequently, another embodiment of the present disclosure will be described with reference to FIG. 7. The same reference numeral as the above-described embodiment denotes the same element, and repeated description of the same element is omitted and the following description will be made based on difference(s) from the above-described embodiment.

In the above-described embodiment, it is impossible to variably adjust the relative position of the upper exit port 102a and the lower exit port 101a due to one intermediate die block 120, while according to another embodiment of the present disclosure, it is possible to easily adjust the relative position of the upper exit port 102a and the lower exit port 101a.

To this end, the multi-slot die coater 100' according to another embodiment of the present disclosure includes the intermediate die block 120 including a first intermediate die block 122 and a second intermediate die block 124, and the first intermediate die block 122 and the second intermediate die block 124 are in surface contact with each other at upper and lower positions and provided slidably along the contact surface to make a relative movement. Additionally, the first intermediate die block 122 and the lower die block 110 are fixed and coupled to each other by bolt fastening, and the second intermediate die block 124 and the upper die block 130 are fixed and coupled to each other by bolt fastening. Accordingly, the first intermediate die block 122 and the lower die block 110 may move together, and the second intermediate die block 124 and the upper die block 130 may move together.

The multi-slot die coater 100' may include two exit ports 101a, 102a spaced apart from each other along the horizontal direction and disposed at front and rear positions as necessary. That is, the relative movement of the lower die block 110 and the upper die block 130 may be made using a separate device for adjusting the shape of the multi-slot die coater 100' or through an operator's manual task.

For example, a step D may be formed between the lower exit port 101a and the upper exit port 102a by moving the upper die block 130 a predetermined distance along a sliding surface in the forward or rearward direction opposite the direction in which the coating solutions 50, 60 emerges, while keeping the lower die block 110 unchanged. Here, the sliding surface refers to a facing surface of the first intermediate die block 122 and the second intermediate die block 124.

The width D of the step may be determined in the range of approximately a few hundreds of micrometers to a few millimeters, and may be determined based on the properties and viscosity of the first coating solution 50 and the second coating solution 60 formed on the substrate 300 or a desired thickness of each layer on the substrate 300. For example, with the increasing thickness of the coating layer that will be formed on the substrate 300, the width D of the step may increase.

Additionally, since the lower exit port 101a and the upper exit port 102a are spaced apart from each other along the horizontal direction as described above, there is no likelihood that the second coating solution 60 issuing from the upper exit port 102a enters the lower exit port 101a, or the first coating solution 50 issuing from the lower exit port 101a enters the upper exit port 102a.

That is, the coating solution emerging through the lower exit port 101a or the upper exit port 102a is blocked by the surface having the step between the lower exit port 101a and the upper exit port 102a, so there is no likelihood that the coating solution enters the other exit port, and thereby it is possible to perform the multilayer active material coating process more smoothly.

When it is necessary to change the relative position between the lower exit port 101a and the upper exit port 102a, the multi-slot die coater 100' according to another embodiment of the present disclosure can simply adjust by the sliding movement of the lower die block 110 and/or the upper die block 130, and does not need to disassemble and re-assemble each die block 110, 120, 130, thereby significantly improving the workability.

As described above, according to another aspect of the present disclosure, it is possible to easily adjust the position of the upper exit port and the lower exit port by the relative movement of the upper die block and the lower die block according to the coating process conditions, thereby improving the workability of multi-slot coating.

Figure 8:
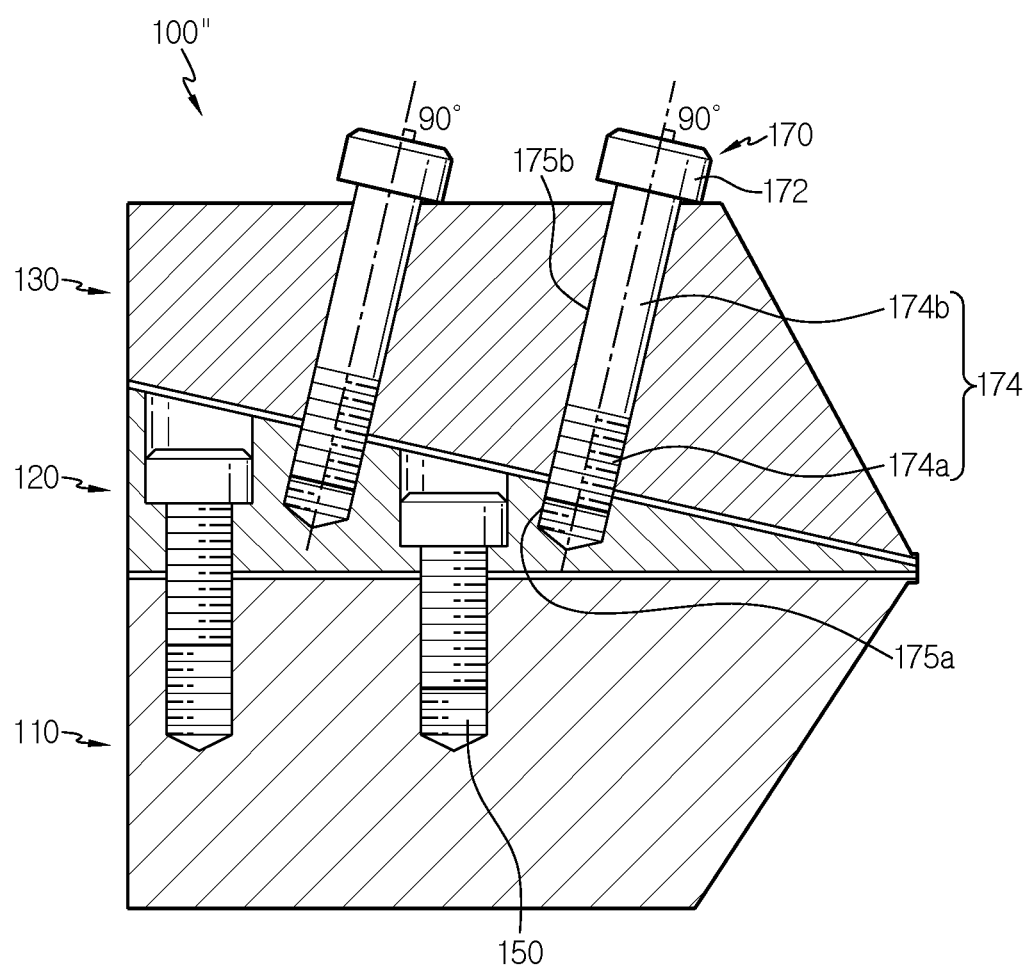
FIG. 8 is a cross-sectional view showing bolt fastening between die blocks in a multi-slot die coater according to still another embodiment of the present disclosure.

FIG. 8 is a cross-sectional view showing bolt fastening between die blocks in a multi-slot die coater according to still another embodiment of the present disclosure. The same reference numeral as the above-described embodiment denotes the same element, and repeated description of the same element is omitted and the following description will be made based on difference(s) from the above-described embodiment. Instead of the bolt 140 in FIG. 4, FIG. 8 shows a bolt 170.

Referring to FIG. 8, the bolt 170 is fastened perpendicular to the contact surface between the upper die block 130 and the intermediate die block 120 of the multi-slot die coater 100". A plurality of bolts 170 may be fastened along the widthwise direction of the upper die block 130, and a plurality of bolts 170 may be fastened along the lengthwise direction of the upper die block 130.

The bolt 170 includes a bolt head 172 and a bolt leg 174. The bolt head 172 protrudes beyond the upper die block 130.

The bolt leg 174 includes a threaded portion 174a close to the intermediate die block 120 and a plain portion 174b close to the upper die block 130. To accommodate the bolt 150, the upper die block 130 and the intermediate die block 120 have bolt holes 175b, 175a aligned with each other.

Each die block 110, 120, 130 is vulnerable to deformation due to its small thickness, and bolt fastening is prone to cause deformation by the action of a large force, so caution is required. The tolerance of the hole for bolt fastening may cause each die block 110, 120, 130 to deform. When impurities enter the hole having such tolerance, an assembling imbalance occurs at the time of bolt fastening, causing deformation. Since the multi-slot die coater 100" is used in a process using an electrode active material slurry, impurities may enter the hole with high likelihood or a large number of times, and after the impurities are introduced, it is difficult to remove the impurities, so it is important to prevent impurities from entering.

In this embodiment, the bolt head 172 is not embedded in the upper die block 130, and the bolt head 172 protrudes beyond the upper die block 130. Even though there is a tolerance of the holes 175a, 175b for bolt fastening, since the bolt head 172 closes the hole 175b, it is possible to prevent impurities from entering the holes 175a, 175b. Accordingly, it is possible to prevent the imbalance of the bolt fastening assembly caused by the impurity introduced into the hole and avoid deformation of each die block.

As described above, according to another aspect of the present disclosure, it is possible to prevent impurities from entering the holes 175a, 175b for bolt fastening, and avoid deformation of each die block. Meanwhile, the bolt head 172 protrudes beyond the upper die block 130, and to fasten the contact surface between the upper die block 130 and the intermediate die block 120 through the bolt 170, the bolt 170 is longer than the bolt 140. In this instance, when the screw thread is formed all over the bolt leg 174, a strong torque is applied at the time of bolt fastening and it takes a long time to fasten. Accordingly, it may be desirable to form the screw thread on an area necessary for fastening and not to form the screw thread on the remaining area. Accordingly, the bolt leg 174 may include the threaded portion 174a close to the intermediate die block 120 and the plain portion 174b close to the upper die block 130.

While the present disclosure has been described with respect to a limited number of embodiments and drawings, the present disclosure is not limited thereto, and it will be apparent to those skilled in the art that a variety of changes and modifications may be made thereto within the technical aspects of the present disclosure and the appended claims and their equivalent scope.

What is claimed is:

1. A multi-slot die coater comprising a first slot and a second slot to extrude and coat a coating solution on a surface of a continuously moving substrate through at least one of the first slot or the second slot, the multi-slot die coater comprising:
    a first outer die block;
    an intermediate die block positioned adjacent to the first outer die block such that the first slot is formed between the intermediate die block and the first outer die block; and
    a second outer die block positioned adjacent to the intermediate die block such that the second slot is formed between the second outer die block and the intermediate die block,
    wherein the die-coater includes a first contact surface between the first outer die block and the intermediate die block, and a second contact surface between the intermediate die block and the second outer die block that is inclined relative to the first contact surface, and a fastener is fastened substantially perpendicular to one of the first and second contact surfaces
    wherein the intermediate die block includes a first intermediate die block and a second intermediate die block in surface contact with each other, the first intermediate die block and the second intermediate die block configured to slidably move along a third contact surface relative to each other,
    the first intermediate die block is fixed and coupled to the first outer die block, and the second intermediate die block is fixed and coupled to the second outer die block, and
    wherein the multi-slot die coater extends from a front end to a rear end opposite the front end, and wherein the third contact surface between the first intermediate die block and the second intermediate die block extends along a single plane from the front end to the rear end.

2. The multi-slot die coater according to claim 1, wherein a perpendicular range at which the fastener is fastened to one of the first and second contact surfaces is an angle range of 90±10° relative to the contact surface.

3. The multi-slot die coater according to claim 1, wherein the contact surface between the second outer die block and the intermediate die block is inclined.

4. The multi-slot die coater according to claim 1, wherein the first outer die block, the intermediate die block and the second outer die block have a first outer die lip, an intermediate die lip and a second outer die lip, each forming the front end thereof, respectively, wherein a first exit port is formed between the first outer die lip and the intermediate die lip and is in communication with the first slot, a second exit port is formed between the intermediate die lip and the second outer die lip and is in communication with the second slot, and a predetermined step is formed between the first exit port and the second exit port.

5. The multi-slot die coater according to claim 1, further comprising:
a first spacer interposed between the first outer die block and the intermediate die block to adjust a width of the first slot, and
a second spacer interposed between the intermediate die block and the second outer die block to adjust a width of the second slot.

6. The multi-slot die coater according to claim 1, wherein the first outer die block includes a first manifold which holds a first coating solution, the first manifold being in communication with the first slot, and the intermediate die block includes a second manifold which holds a second coating solution, the second manifold being in communication with the second slot.

7. The multi-slot die coater according to claim 1, wherein the first slot and the second slot form an angle between about 30° and about 60°.

8. The multi-slot die coater according to claim 1, wherein the fastener is a bolt.

9. The multi-slot die coater according to claim 8, wherein a bolt leg of the bolt includes a threaded portion disposed within the intermediate die block and a plain portion disposed within the second outer die block, and the second outer die block and the intermediate die block have bolt holes aligned with each other to accommodate the bolt.

10. A multi-slot die coater comprising a first slot and a second slot to extrude and coat a coating solution on a surface of a continuously moving substrate through at least one of the first slot or the second slot, the multi-slot die coater comprising:
a first outer die block;
an intermediate die block positioned adjacent to the first outer die block such that the first slot is formed between the intermediate die block and the first outer die block; and
a second outer die block positioned adjacent to the intermediate die block such that the second slot is formed between the second outer die block and the intermediate die block,
wherein the die-coater includes a first contact surface between the first outer die block and the intermediate die block, and a second contact surface between the intermediate die block and the second outer die block that is inclined relative to the first contact surface, and a first fastener is fastened substantially perpendicular to the second contact surface and a second fastener is fastened substantially perpendicular to the first contact surface, wherein the first fastener is a bolt which has a bolt head protruding beyond the second outer die block,
wherein the multi-slot die coater extends from a front end to a rear end opposite the front end, and
wherein the intermediate die block includes a first intermediate die block and a second intermediate die block in surface contact with each other, the first intermediate die block and the second intermediate die block configured to slidably move along a third contact surface relative to each other, and the third contact surface extends along a single plane from the front end to the rear end.

11. The multi-slot die coater according to claim 10, wherein a perpendicular range at which the fastener is fastened to one of the first and second contact surfaces is an angle range of 90±10° relative to the contact surface.

12. The multi-slot die coater according to claim 10, wherein the contact surface between the second outer die block and the intermediate die block is inclined.

13. The multi-slot die coater according to claim 10, wherein the intermediate die block includes a first intermediate die block and a second intermediate die block in surface contact with each other, the first intermediate die block and the second intermediate die block configured to slidably move along a third contact surface relative to each other, and
the first intermediate die block is fixed and coupled to the first outer die block, and the second intermediate die block is fixed and coupled to the second outer die block.

14. The multi-slot die coater according to claim 10, wherein the first outer die block, the intermediate die block and the second outer die block have a first outer die lip, an intermediate die lip and a second outer die lip, each forming the front end thereof, respectively, wherein a first exit port is formed between the first outer die lip and the intermediate die lip and is in communication with the first slot, a second exit port is formed between the intermediate die lip and the second outer die lip and is in communication with the second slot, and a predetermined step is formed between the first exit port and the second exit port.

15. The multi-slot die coater according to claim 10, further comprising:
a first spacer interposed between the first outer die block and the intermediate die block to adjust a width of the first slot, and
a second spacer interposed between the intermediate die block and the second outer die block to adjust a width of the second slot.

16. The multi-slot die coater according to claim 10, wherein the first outer die block includes a first manifold which holds a first coating solution, the first manifold being in communication with the first slot, and the intermediate die block includes a second manifold which holds a second coating solution, the second manifold being in communication with the second slot.

17. The multi-slot die coater according to claim 10, wherein the first slot and the second slot form an angle between about 30° and about 60°.

18. The multi-slot die coater according to claim 13, wherein the third contact surface between the first intermediate die block and the second intermediate die block extends along a single plane.

19. The multi-slot die coater according to claim 10, wherein the second fastener has a fastener head disposed in the intermediate die block and a fastener leg disposed in the first outer die block.

20. A multi-slot die coater comprising:
a first outer die block;
an intermediate die block positioned adjacent to the first outer die block such that a first slot is formed between the intermediate die block and the first outer die block; and
a second outer die block positioned adjacent to the intermediate die block such that a second slot is formed between the second outer die block and the intermediate die block,
wherein the die-coater includes a first contact surface between the first outer die block and the intermediate die block, and a second contact surface between the intermediate die block and the second outer die block that is inclined relative to the first contact surface, and a first fastener is fastened through the first contact surface substantially perpendicular to the first contact surface and a second fastener is fastened through the second contact surface in a direction parallel to the first fastener,
wherein the multi-slot die coater extends from a front end to a rear end opposite the front end, and
wherein the intermediate die block includes a first intermediate die block and a second intermediate die block in surface contact with each other, the first intermediate die block and the second intermediate die block configured to slidably move along a third contact surface relative to each other, and the third contact surface extends along a single plane from the front end to the rear end.

* * * * *